Figure 1:
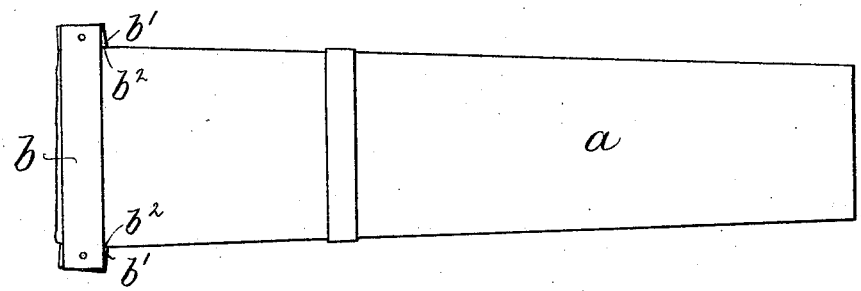

(No Model.)

G. S. BOND.
METHOD OF AND APPLIANCE FOR BENDING WOOD.

No. 360,848. Patented Apr. 12, 1887.

Witnesses,
Jas. J. Maloney
H. P. Bates

Inventor,
Geo. S. Bond
by Jos. P. Livermore
Att'y

UNITED STATES PATENT OFFICE.

GEORGE S. BOND, CHARLESTOWN, NEW HAMPSHIRE.

METHOD OF AND APPLIANCE FOR BENDING WOOD.

SPECIFICATION forming part of Letters Patent No. 360,848, dated April 12, 1887.

Application filed September 28, 1886. Serial No. 214,757. (No model.)

*To all whom it may concern:*

Be it known that I, GEORGE S. BOND, of Charlestown, county of Sullivan, State of New Hampshire, have invented an Improvement in Method of and Appliance for Molding Wood, of which the following description, in connection with the accompanying drawings is a specification, like letters on the drawings representing like parts.

My invention relates to a method of bending wood, applicable in the manufacture of articles—such as violin-cases and the like—in which a flat piece of wood or board in its natural state is to be bent or molded into a convex form by changing its curvature in directions both parallel with and transverse to the direction of the grain of the wood. For example, in making the cover of a violin-case it is desirable to produce a deep concavity or recess in the under side of the cover to receive the bridge of the violin. This concavity or bulge in the wood is so great that when molded by the ordinary process of steaming and then pressing in dies the wood would be so stretched in forming the rounded or bulged portion as to form an extra fullness in the part that is intended to be flat near the bulged portion, such extra fullness resulting in a crimping or puckering of the wood in the direction transverse to the grain thereof, which is extremely objectionable. This objection has been overcome by removing a gore from the wood about equal to the extra fullness, which gore-opening becomes closed in the process of molding and preferably has its edges united by glue.

The object of the present invention is to enable an integral piece to be properly stretched or bulged without producing extra fullness in the part adjacent to the bulge, thus producing a whole top of substantially the same shape but of greater strength than the gored tops previously mentioned.

In molding or convexing a board—as, for example, in making a whole top for a violin-case in accordance with this invention—the board is held in a clamp, which embraces and confines the board from bending in a direction transverse to its grain in the part adjacent to the bulged portion, where the fullness would occur if the board were molded by the ordinary method, said clamp preferably being applied before the board is steamed or softened, and thus restraining the part held by it from expanding or stretching under the steaming process so much as it would if not held by the clamp, which is also retained applied to the steamed board during the subsequent process of molding in dies, which may be done in the usual manner, thus enabling the bulge to be produced in the wood at the proper point while the wood adjacent to the said bulge is prevented from stretching or puckering by the clamp that holds it.

The invention also consists in employing an elastic flexible former composed of a strip of metal flanged at its ends to engage the edge of the board, the said strip being applied in a direction transverse to the grain thereof, and lying on the side that is to be convex in the mold, and moving into the die with the wood, which it tends to draw together at the edges, and thus prevents the board from splitting under the action of the dies.

Figure 2:
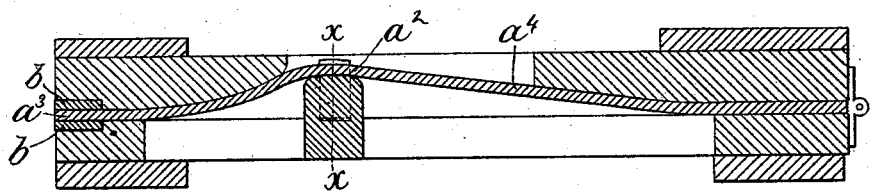

Figure 1 is a plan view of a blank or board ready to be molded in accordance with this invention; Fig. 2, a longitudinal section of the board as it appears in the mold; and Fig. 3, a transverse section on line $x\ x$, Fig. 2.

The invention is shown as employed for the production of the top of a violin-case by molding an integral flat board, by bending or curving the same both in the direction parallel with and transverse to its grain; but it is obvious that the process and appliances might be used for molding other articles in which a thin sheet or blank has to have portions of its surface bulged or convexed in dies by bending or curving the same in directions both parallel with and transverse to its grain. The usual process of bending or molding these pieces of wood consists in steaming the pieces to give their fiber toughness and pliability, and then pressing the steamed pieces in molds to the desired shape, which the piece will retain when its fibers become dried. When, however, it is attempted to produce a very high relief in the molded article, as represented by the bulge or convexity $a^2$, Figs. 2 and 3, the stretching of the material is so great as to be imparted to the flat portion $a^3$ (see Fig. 2) adjacent to the bulge, and if the board or blank $a$, Fig. 1, were treated by the ordinary process of steaming the entire blank, and then forming it in molds, the part $a^3$ would also be stretched transversely, and as there is no curvature to take up the fullness or stretching it would become puckered or corrugated transversely, thus injuring its appearance and impairing the value of the molded article. In order to overcome this objection and enable a board or thin piece of wood to be molded to the desired convexity without puckering the adjacent portions, and without removing any of the material, the portion of the board or blank adjacent to the bulged portion is, in accordance with this invention, confined in a close-fitting clamp, $b$, preferably of metal, which fits tightly on the faces of the board $a$, lying transverse to the grain thereof, as shown in Fig. 2, and also bears against the edges of the board, as shown at $b^2$, Fig. 1, the said clamp preferably consisting of two rigid bars of metal connected at their ends by pieces $b'$, of a thickness equal to the thickness of the board or blank to be molded, the said end pieces, $b'$, being preferably pivoted, as shown, so as to come to a bearing on the edges of the blank $a$, which are preferably tapered or inclined, as shown, so as to wedge into the clamp. The blank $a$, when held in the clamp $b$, as described, is steamed or dampened in the usual manner to render its fiber pliable, so that it may be stretched into the desired shape and may retain said shape after it is dried. This steaming process causes the board to swell laterally; but the clamp $b$ partially protects the portion within it from the action of the steam or moisture, so that it has less tendency to swell or expand than the adjacent portion, and, further than this, the clamp positively prevents such expansion. The board or blank $a$, having its main portion steamed and swelled, but having a portion of its surface confined and prevented from swelling, is then subjected to the action of the dies or molded in the usual manner. The dies act to produce the greatest convexity or relief in the part adjacent to that held by the clamp $b$, thus taking up the extra width produced by the expansion of this part, and even stretching the material laterally at this point, while the clamp $b$ holds the flat portion $a^3$ adjacent to the bulged portion $a^2$, retaining it flat and preventing it from puckering or corrugating.

Figure 3:
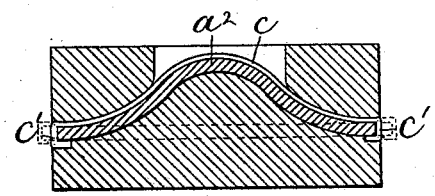

In order to facilitate the molding of the bulged portion $a^2$, and to prevent the board from splitting, I apply to the said board before it is molded an elastic former, $c$, consisting of a strip of elastic metal having its ends flanged or turned over, as shown at $c'$, Fig. 3, to engage the edges of the board. The flat portion of the former $c$ lies on the face of the board that is to be convex when molded, and when the board is subjected to the action of the dies in molding the said clamp or former $c$ draws the edges of the board inward, as indicated by the dotted and full lines, Fig. 3, so that the bulged shape is impressed upon the board without any considerable lateral stretching of the board or tendency to split the same, the said former $c$ being practically inextensible in length, so that the width of the board measured along the curved surface, Fig. 3, is substantially the same as its original width measured along the straight surface indicated in dotted lines. In the article herein represented—namely, the top of a violin-case—the bulged portion $a^2$ rises steeply from the flat portion $a^3$ at one side, while the other side tapers gradually, as shown at $a^4$, to the original level of the board, so that it will readily conform to the dies in molding in the usual manner. If, however, the relief were to be equally great at either side of the bulge or stretched portion, the board or blank may be held by clamps transverse to its grain similar to the one $b$ at either side of the portion that is to be raised or in high relief.

I claim—

1. That improvement in the art or method of molding wood articles from a blank or thin sheet of wood in its natural state, which consists in restraining a portion of the said piece from bending in a direction transverse to the grain, then steaming or moistening the said blank, and molding it by pressure while a portion is still restrained from bending in the direction transverse to its grain, substantially as and for the purpose described.

2. In an apparatus for molding wood articles in relief from a blank or thin sheet of wood, the combination of a clamp that embraces the blank and confines a portion thereof from bending in a direction transverse to its grain, with an elastic former applied to the blank in a direction transverse to its grain, lying on one face of the blank and engaging the edges thereof, and dies that act on the blank to bend the same in directions both parallel with and transverse to the grain at the part acted upon by the elastic former, substantially as described.

In testimony whereof I have signed my name to this specification in the presence of two subscribing witnesses.

GEORGE S. BOND.

Witnesses:
GEORGE OLCOTT,
HERBERT W. BOND.